United States Patent
Byrn et al.

(10) Patent No.: US 7,818,695 B2
(45) Date of Patent: Oct. 19, 2010

(54) REDISTRIBUTION OF CURRENT DEMAND AND REDUCTION OF POWER AND DCAP

(75) Inventors: Jonathan W. Byrn, Fort Collins, CO (US); Mark F. Turner, Longmont, CO (US); Jeffrey S. Brown, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 390 days.

(21) Appl. No.: 11/962,165

(22) Filed: Dec. 21, 2007

(65) Prior Publication Data
US 2009/0164956 A1 Jun. 25, 2009

(51) Int. Cl.
*G06F 17/50* (2006.01)

(52) U.S. Cl. .................. 716/3; 716/1; 716/2; 716/4; 716/5; 716/6

(58) Field of Classification Search .................. 716/1–6
See application file for complete search history.

(56) References Cited

U.S. PATENT DOCUMENTS 7,055,121 B1 * 5/2006 Bolander et al. .............. 716/11
7,222,311 B2 * 5/2007 Kaufman et al. .............. 716/2
7,716,618 B2 * 5/2010 Ferrari et al. ................. 716/11

\* cited by examiner

*Primary Examiner*—Nghia M Doan
(74) *Attorney, Agent, or Firm*—Christopher P. Maiorana, PC

(57) ABSTRACT

A method to redistribute current demand is presented. The method includes a first step of determining timing arc data for one or more timing arcs of a circuit design. The method includes a second step of checking the timing arc data for delay shift target cells. The method includes a further step of swapping a delay shift target cell with a delay shift cell.

22 Claims, 4 Drawing Sheets

REDISTRIBUTION OF CURRENT DEMAND AND REDUCTION OF POWER AND DCAP

FIELD OF THE INVENTION

The present invention relates to integrated circuit design generally and, more particularly, to a method and/or apparatus to redistribute current demand and reduce power and decoupling capacitance (DCAP).

BACKGROUND OF THE INVENTION

Managing power and power related issues in application specific integrated circuits (ASICs) and standard silicon products (SSPs) is becoming increasingly difficult. One area of particular concern is dynamic power and instantaneous current draw in 1 Volt technologies. A current/power spike typically occurs around the switching of a clock or clocks in a design. The design has to provide for the current to switch the circuits. One way the designer can account for the current is with an energy/current density function curve.

Referring to FIG. 1, a diagram 10 is shown illustrating example energy/current density function curves 12 and 14. In an ideal case, all of the current would be evenly distributed during a clock cycle as illustrated by the curve 12. An evenly distributed current demand allows the design to use a simple robust power grid without decoupling capacitors (DCAPs). However, because most switching occurs around the clock transitions, most of the time the current demand distribution is far from ideal, as illustrated by the curve 14. Instead, a design has to accommodate a power spike at the beginning of the clock cycle. If the spike is not eliminated, problems can occur. Some examples of problems include: (i) the power grid can ring at some harmonic related to the clock; (ii) the voltage can dip below a storage element retention level; (iii) the timing can fail due to low voltage performance loss. Higher speed designs that tend to be zero skew in nature can make the problems even worse.

Conventional solutions include compensation and avoidance. A conventional compensation technique involves using special circuit elements that act as local power reserves to supply enough current to allow switching with minimum power supply noise and droop. The special circuit elements can include some form of capacitor. A common version is a decoupling capacitor (DCAP). Another compensation technique involves using a very robust power grid. A conventional avoidance technique uses intentional manipulation of the clocks within the design in an attempt to distribute the current demand. If the clocks can be skewed in a controlled fashion, the current demand can be redistributed and the spike reduced.

The conventional solutions have significant problems. The problems become increasingly worse as the frequency of the design increases and when datapath logic is involved. Decoupling capacitors (DCAPs) are becoming more and more expensive to use. As the industry moves to progressively finer technology nodes, the DCAPs are becoming less capacitive, more resistive, and/or less area optimized. At the same time, leakage currents associated with the DCAPs are progressively increasing.

The compensation and avoidance techniques can be used together to help manage issues surrounding dynamic power. In order to compensate for the current spike associated with the dynamic power, the leakage power is increased. In addition, since the amount of capacitance provided by the DCAPs is decreasing, the amount of area consumed by the DCAPs must be increased to compensate. In a design using conventional techniques, the DCAP area can be larger than the logic area. For slower speed logic a 35% area increase is routinely seen. Both of the above problems, substantial area and leakage increases, represent significant issues that can become progressively worse as circuit geometries shrink and frequencies increase.

Creating a very robust power grid can help somewhat, but is not usually sufficient by itself. However, as the power grid is enhanced, the amount of routing resources are decreased or metal layers have to be added. Both decreased routing resources and additional metal layers can represent significant problems. Moving clocks is possible, but involves progressively increasing complexity, progressive design closure uncertainty and diminishing returns as clock frequencies increase. There are a number of reasons why moving clocks can be complex. One reason is that the conventional practice is for a leaf node clock cell to drive many flip-flops. Changing a single clock buffer can affect many timing arcs. The affected timing arcs must still pass timing post optimization.

Because affected timing arcs must still pass timing post optimization, the number of valid targets can be limited or can make the timing results worse. When the number of valid targets is limited or the timing results worsen, the design can become un-closable. In addition, as clock frequencies increase, the opportunities to effectively exploit the technique of moving clocks decreases because the relationship between the total clock cycle and the amount of delay associated with the intentional clock tree skew for power degrades.

SUMMARY OF THE INVENTION

The present invention concerns a method to redistribute current demand is presented. The method includes a first step of determining timing arc data for one or more timing arcs of a circuit design. The method includes a second step of checking the timing arc data for delay shift target cells. The method includes a further step of swapping a delay shift target cell with a delay shift cell.

The objects, features and advantages of the present invention include providing a method and/or apparatus for redistribution of current demand and reduction of power and DCAP that may (i) provide a delay shift class of cells and cell classification, (ii) provide fine grained path-based circuit switching redistribution, (iii) spread out current spikes, (iv) re-distribute current spikes, (v) be compatible with other power reduction techniques, (vi) reduce or eliminate need for DCAP, (vii) avoid clock tree manipulation, (viii) avoid destabilizing effects of clock tree manipulation, (ix) extend the current technology library, (x) be fully compatible with VT Class and channel length cell swapping techniques for leakage power management, (xi) be used to enhance VT class shifting and channel length swapping, (xii) be highly granular in application, (xiii) cause little or no negative disturbance to a design, (xiv) take little or no increased area over the base library, (xv) eliminate dedication of large areas of a chip to DCAPs, (xvi) eliminate leakage current associated with leaky DCAP cells, (xvii) reduce package costs by allowing for a less expensive package, (xviii) be applicable late in the design flow with little or no impact other than flattening current spikes, (xix) be broadly applicable across nearly all design types, (xx) create very useful results even when the only cells involved are flip-flop cells, (xx) introduce asymmetry with respect to timing arcs and/or (xxi) provide additional incremental benefits when additional cells are involved.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In one aspect, the present invention generally provides a new type of cell. In one example, the new type of cell may be referred to as a delay shift cell. In some cases new cell designs are implemented. In other cases, a new set of properties may be associated with existing library cells. The properties of the new or modified cells may be used to spread and reduce current spikes. The new or modified cells may be configured to introduce asymmetry with respect to timing arcs of a circuit design. For example, substitution (or swapping) of a base (or standard) cell with a modified (or delay shift) cell may shift a time at which one or more downstream circuits of one or more respective timing arcs may switch. The modified or delay shift cells may retain other key power/performance characteristics such as channel length or voltage threshold (VT) class.

Figure 1:
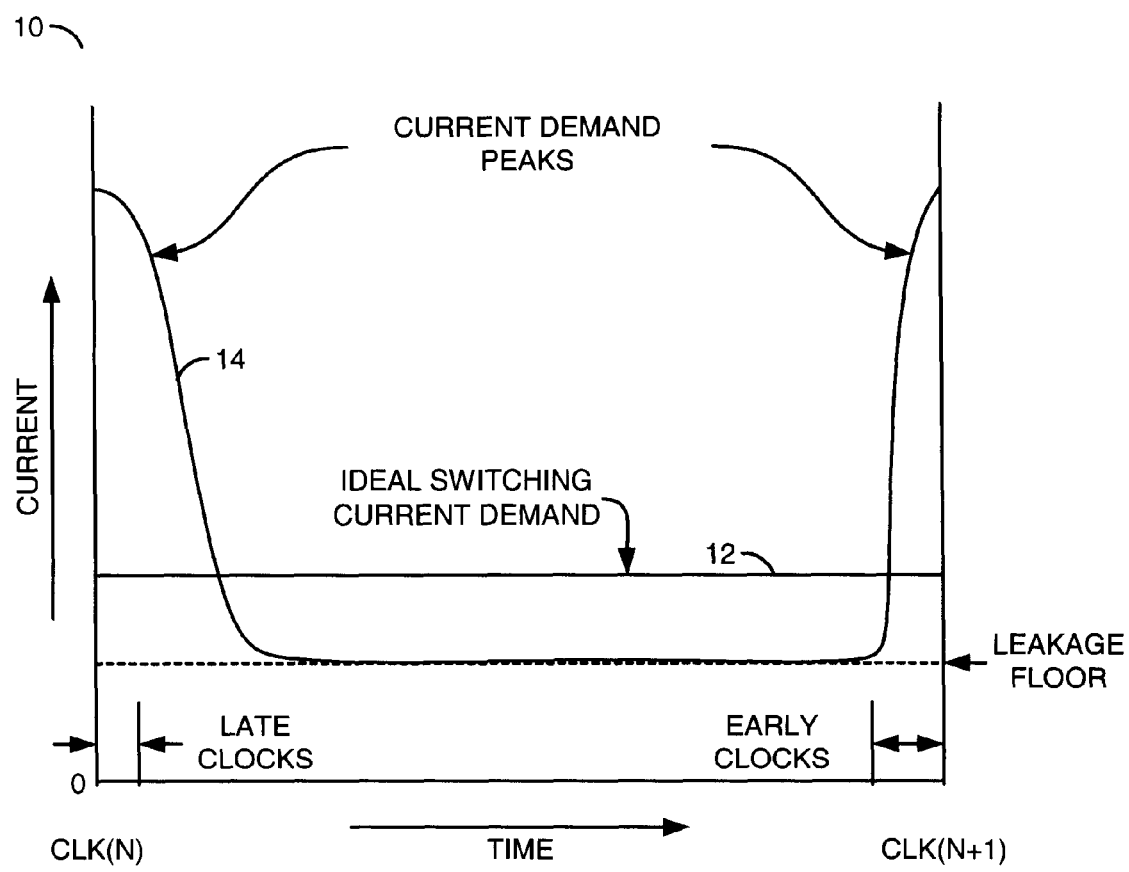
FIG. 1 is a diagram illustrating energy/current density function curves.
Figure 2:
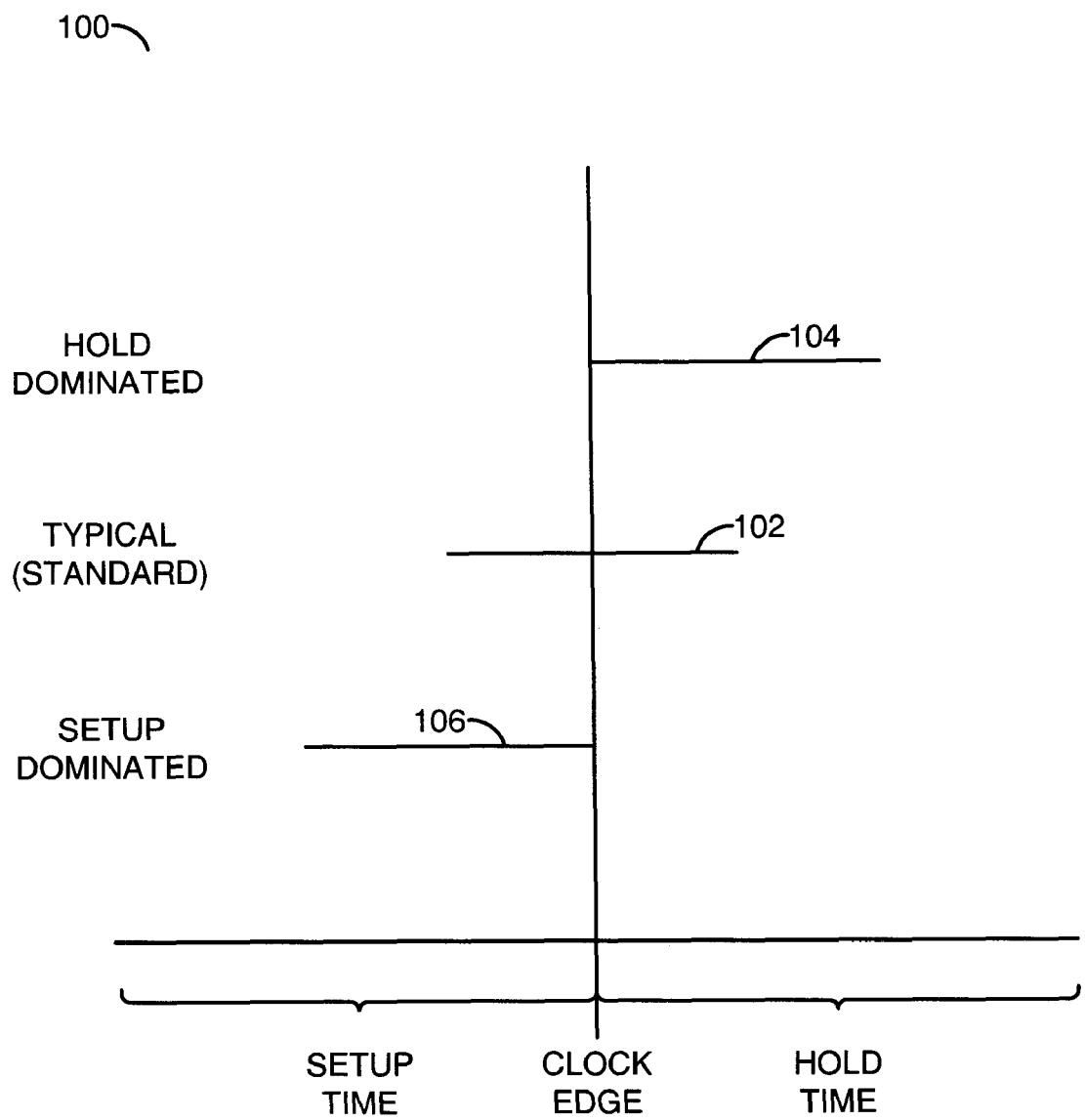
FIG. 2 is a diagram illustrating a delay shifting technique in accordance with the present invention.

Referring to FIG. 2, a diagram 100 is shown illustrating adjustment of timing parameters associated with a flip-flop cell implemented in accordance with the present invention. In one example, the present invention may be implemented in a flip-flop cell. Flip-flops are storage elements that have specific timing characteristics. The timing characteristics may be partitioned between a number of possible timing parameters. The possible timing parameters may include, but are not limited to, (i) setup time and/or (ii) hold time. Setup time generally refers to an amount of time prior to an active edge of a clock associated with the flip-flop during which data at an input of the flip-flop must remain stable, in order for the flip-flop to capture the data. Hold time generally refers to an amount of time that the data must be held at the input to the flip-flop after the active edge of the clock associated with the flip-flop.

A time budget for a standard flip-flop cell may be balanced between the setup time and the hold time, as illustrated by the line 102. However other time budget distributions may be implemented. For example, a flip-flop may be constructed with the timing budgets shifted. In one example, a flip-flop may be built where the setup time is zero and the hold time is the whole budget, as illustrated by the line 104. In another example, a flip-flop may be built where the hold time is zero and the setup time is the whole budget, as illustrated by the line 106. In another example, a number of flip-flop cells may be implemented where the time budget for each flip-flop is shifted by a different amount.

In another example, the present invention may be implemented in a multiplexer cell. For example, a number of versions of multiplexer cells may be implemented, each with different timing budget characteristics for specific configurations. For example there may be a version with a fast data path and slow selector path, there may be a version with a slow data path and a fast selector path, etc.

In yet another example, a full adder cell may be implemented in accordance with the present invention. For example, versions of the full adder may be implemented that vary the timing budget between an add path and a carry path. Although flip-flop, multiplexer and full adder examples have been presented, it will be apparent to those of ordinary skill in the relevant art that corresponding delay shift cells in accordance with the present invention may be implemented for each base (or standard) cell in a base library. For example, a standard cell library may, in one example, have 800 cells. A corresponding delay shift library may comprise one or more delay shift cells corresponding to each of the 800 standard cells. Different cell versions of the standard cells may be configured to provide various delays, variable delays and/or programmable delays in each pathway of a cell. For example, a two input delay shift NAND gate cell may provide different delays between each of the inputs and the output.

In general, each cell type may be footprint compatible. For example, each version of a cell may replace another version of that cell without affecting surrounding circuitry layout and/or routing. For example, all that changes is the internal construction of the cells. In another example, non-footprint-compatible cells may be padded out to be at least partially footprint-compatible.

In one example, the cell data may be used in conjunction with timing data to swap in cells based on delay shift characteristics. A process for swapping in cells based on delay shift characteristics is described below in connection with FIG. 4. The net effect of swapping cells may be to shift path element delays and thereby redistribute switching current while still maintaining timing and other key design characteristics. For example, a current density curve may be created for a design that contains the current information for all of the circuits over time. The current density curve may be used to determine where a delay shift cell (or circuit) may be most optimally swapped in. In one example, data mining techniques may be used to examine the currents and timing up and downstream of each circuit element over time.

The results of the examination may be used to generate an opportunity map. The opportunity map may be configured to indicate where a delay shift cell or cells may be inserted (swapped). For example, if a map is generated and shows that the circuit delay could be shifted either plus or minus and still preserve timing results, a swap may be performed. The process may be repeated until there are no further opportunities or the results are sufficiently robust. In an ideal case, the current density is normalized over a cycle time.

Figure 3:
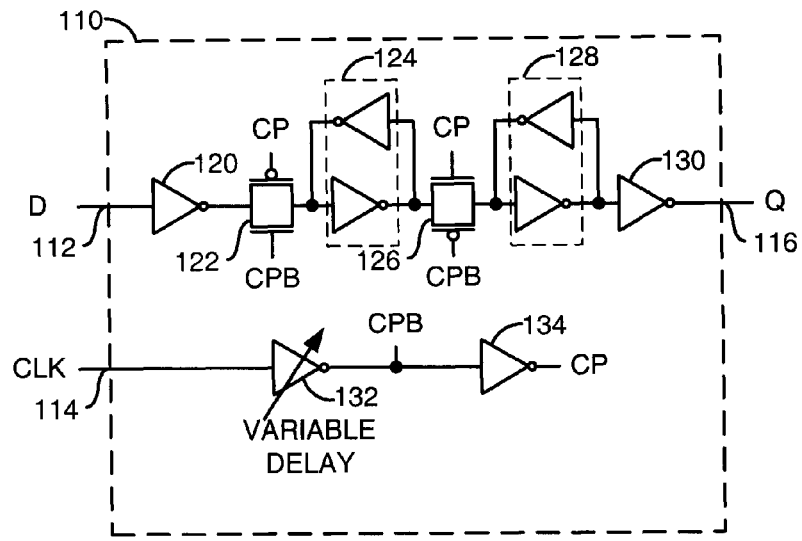
FIG. 3 is a diagram illustrating an example delay shift cell in accordance with an embodiment of the present invention.

Referring to FIG. 3, a diagram is shown illustrating an example delay shift cell 110 in accordance with a preferred embodiment of the present invention. In one example, the delay shift cell 110 may be implemented as a flip-flop with a variable setup/hold time window. However, other types of storage devices (e.g., memories, especially fine grain, latches, registers, etc.) may be implemented accordingly to meet the design criteria of a particular implementation. In one example, the flip-flop 110 may be implemented with a variable clock input path delay such that the timing relationships for assertion/deassertion of a first internal pass gate and a second internal pass gate may be altered relative to a data internal propagation time through the pass gates.

In one example, the delay shift cell 110 may have an input 112 that may receive a data signal (e.g., D), an input 114 that may receive a clock signal (e.g., CLK), and an output 116 that may present an output signal (e.g., Q). In one example, the delay shift cell 110 may comprise a block (or circuit) 120, a block (or circuit) 122, a block (or circuit) 124, a block (or circuit) 126, a block (or circuit) 128, a block (or circuit) 130, a block (or circuit) 132 and a block (or circuit) 134. The block 120 may be implemented, in one example, as an inverter or inverting buffer circuit. The blocks 122 and 126 may be implemented, in one example, as pass gates. The blocks 124 and 128 may be implemented, in one example, as latches. The block 130 may be implemented, in one example, as an inverter or output driver circuit. The block 132 may be implemented, in one example, as an inverter circuit with a variable (or programmable) delay. The block 134 may be implemented, in one example, as an inverter circuit.

The signal D may be presented to an input of a block 120. An output of the block 120 may be presented to an input of the pass gate 122. An output of the pass gate 122 may be presented to an input of the latch 124. An output of the latch 124 may be presented to an input of the pass gate 126. An output of the pass gate 126 may be presented to an input of the latch 128. An output of the latch 128 may be presented to an input of the inverter 130. An output of the inverter 130 may present the signal Q.

The signal CLK may be presented to an input of the block 132. An output of the block 132 may present an inverted (or complementary) version of the signal CLK (e.g., CPB). The output of the block 132 may be presented to an input of the block 134. An output of the block 134 may present an inverted (or complementary) version of the signal CPB (e.g., CP). The signal CP may be presented to an active-low control input of the pass gate 122 and an active-high control input of the pass gate 126. The signal CPB may be presented to a active-high control input of the pass gate 122 and an active-low control input of the pass gate 126.

Figure 4:
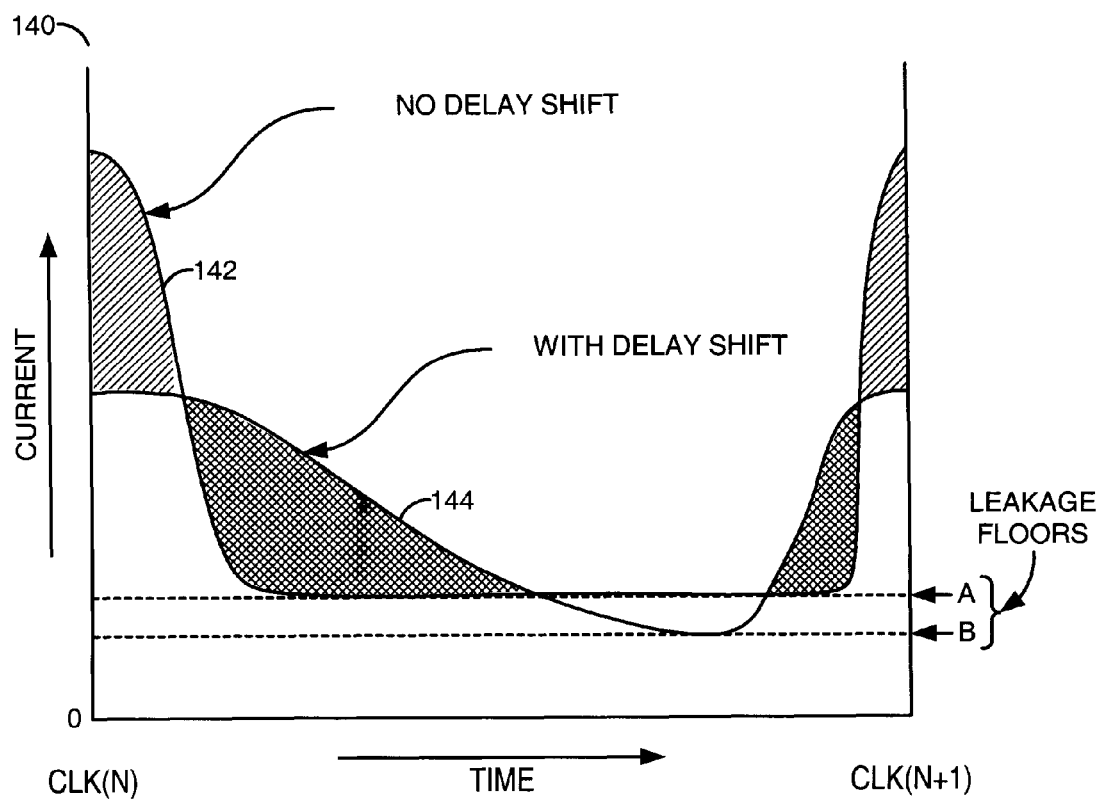
FIG. 4 is a diagram comparing current demand with and without delay shifting in accordance with the present invention.

Referring to FIG. 4, a diagram 140 is shown illustrating current demand with and without a delay shift implemented in accordance with the present invention. In one example, the current demand without implementing a delay may be illustrated by an energy/current density function curve 142 and the current demand with a delay implemented in accordance with the present invention may be illustrated by an energy/current density function curve 144. In general, when no delay shift is implemented, the current demand may be characterized by high current spikes associated with the clock transitions and a respective leakage floor value (e.g., A) between the current spikes.

When a delay shift in accordance with the present invention is implemented, the level of the current spikes may be reduced and the spikes may be spread out in time. The total current demand may remain substantially similar between the two implementations (e.g., the shaded area under the curve 144 may be less than or equal to the shaded area under the curve 142). However, with the delay shift in accordance with the present invention, the current demand may be spread out over a greater amount of time and a respective leakage floor value (e.g., B) may be lower than the leakage floor value A.

Figure 5:
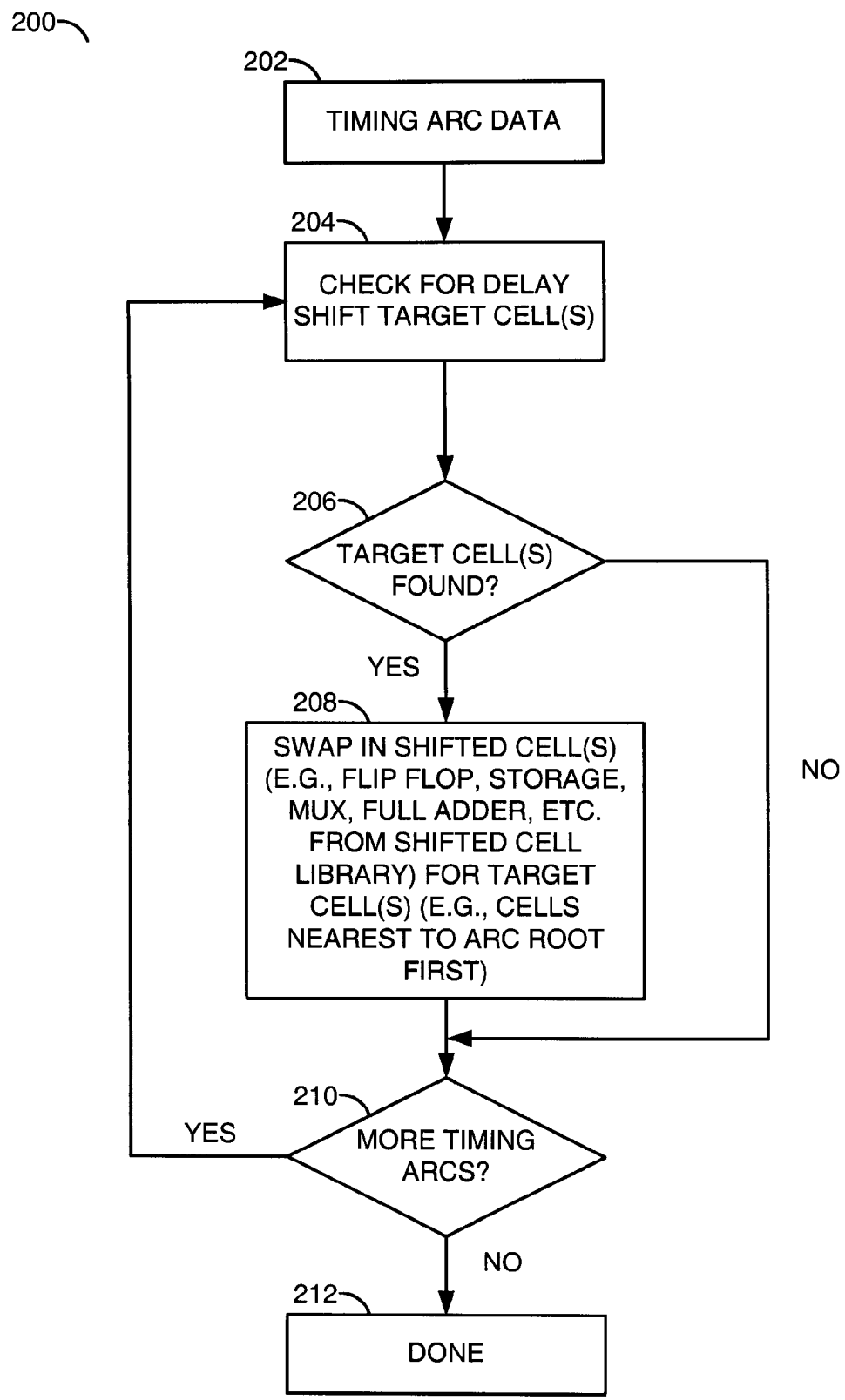
FIG. 5 is a flow diagram illustrating a process in accordance with the present invention.

Referring to FIG. 5, a flow diagram is shown illustrating a process 200 in accordance with a preferred embodiment of the present invention. In one example, the process 200 may be configured for swapping in cells implemented in accordance with the present invention based on delay shift characteristics. For example, the cell data may be used in conjunction with timing data to replace (or swap) one or more cells of a design with corresponding delay shift cells based on delay shift characteristics. The net effect of swapping cells is to shift path element delays and thereby redistribute switching current while still maintaining timing and other key design characteristics.

The process 200 may comprise a block (or process) 202, a block (or process) 204, a block (or process) 206, a block (or process) 208, a block (or process) 210 and a block (or process) 212. The block 202 may be implemented, in one example, as a timing arc data collection block. The block 204 may be implemented, in one example, as a delay shift target cell detection process. The block 206 may be implemented, in one example, as a decision block. The block 208 may be implemented, in one example, as a cell swapping process. The block 210 may be implemented, in one example, as a decision block. The block 212 may be implemented as an end state.

In one example, the process 200 may begin by collecting timing arc data (e.g., the block 202). When the timing arc data has been collected, the process 200 may move to process 204. In a process 204, the design may be checked for delay shift target cells. In one example, checking the design for delay shift targets may comprise looking at combinations of the timing arcs associated with a node in the design. For example, in the case of a flip-flop, the slack to and from the flip-flop may be examined. When there is room on both sides (e.g., both setup and hold times) of the flip-flop, the flip-flop may be considered a delay shift target cell candidate. Additional analysis may be performed to look downstream and determine how much to move (shift) the delay, and in what direction to make the shift.

In one example, the process for determining the amount and/or direction of shift may comprise a energy sum across an area/timeline. For example, the process may involve determining an optimal mix to flatten out the current density function curve. In general, just finding the flip-flops that may be pushed may lead to improvement. When the design has been checked for delay shift target cells, the process 200 may move to the process 206.

The process 206 generally determines whether any target cells were found by the process 204. When target cells have been found, the process 200 may move to the process 208. Otherwise, the process 200 moves to the process 210. The process 208 generally swaps in delay shifted cells to replace the delay shift target cells. In one example, the process 208 may be configured to swap delay shift target cells nearest to an arc root first. However, other swap schemes may be implemented accordingly to meet the design criteria of a particular implementation.

When the delay shift target cell(s) have been replaced by the delay shifted cell(s), the process 200 may move to the process 210. The process 210 may be configured to determine whether more timing arcs remain to be processed. When more timing arcs remain, the process 200 may return to the process 204. When no more timing arcs remain, the process 200 may move to the process 212 and end.

The present invention generally provides a method and/or apparatus for redistributing current demand and reducing power and decoupling capacitors (DCAP) in integrated circuits. The present invention may provide features including: (i) delay shift class cells and cell classifications, (ii) fine-grained path-based circuit switching redistribution, (iii) current spike flattening/re-distribution, (iv) compatibility with other power reduction techniques, (v) reduction or elimination of DCAPs and associated problems, and/or (vi) avoidance of clock tree manipulation and any corresponding destabilizing effects. The present invention may provide advantages including: (i) extending the current technology library, (ii) being fully compatible with voltage threshold (VT) class and channel length cell swapping techniques for leakage power management, (iii) enhancing VT class shifting and channel length swapping, (iv) being highly granular, (v) causing little or no negative disturbance to a design, (vi) taking little or no increased area over the base library (e.g., any increase in area is more than made up in the area recovered from DCAP elimination), (vii) eliminating dedication of large areas of a chip to DCAPs, (viii) eliminating leakage current associated with leaky DCAP cells, further reducing overall power, (ix) reducing package costs by allowing for a less expensive package (e.g., by eliminating or helping to eliminate DCAPs in the package), (x) being applicable late in the design flow with little or no impact other than flattening the current spikes, (xi) being broadly applicable across nearly all design types, (xii) creating useful results even when the only cells involved are flip-flop cells and/or (xiii) providing additional incremental benefits when additional cells are involved.

In general, electronic design automation (EDA) solutions formed around the present invention may be very automatable. Relatively small amounts of delay shift may have a large impact. In one example, a broad application of a 50 ps flip-flop shift implemented in accordance with the present invention may produce a drop in a current spike from about 1.1 amperes peak to about 600 mA peak for a 200 K equivalent NAND gate circuit. In one example, application of the present invention may reduce the approximately 1 $mm^2$ of DCAP used by the 200 K equivalent NAND gate circuit by about half.

The present invention may save additional dynamic and static power as well. DCAPs are typically large and often not area efficient. DCAPs are generally integrated close to where they are used. This increases the overall wire length used to wire the design. The additional wire brings increased parasitics and increased power demand. In addition the additional wire slows the design and increases the demand for higher drive strengths, shorter channels and lower VT classes. Leakage current is also increased. By avoiding the use of DCAPs, additional gains may be obtained.

The delay shift cells in accordance with the present invention may also be useful for facilitating (assisting) timing closure. The delay shift cells may be used to achieve an effect similar to clock-based useful skew but without many of the current limitations. The delay shift cells in accordance with the present invention may provide time budgets (e.g., setup and hold times, data path and selector path speeds, add path and carry path, etc.) that are shifted with respect to corresponding standard cells (e.g., cells having typical (or unshifted) timing budgets). The present invention may also be used to facilitate closing hold violations without adding additional cells, which may greatly simplify hold closure.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

The functions performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention thus may also include a computer product which may be a storage medium including instructions which can be used to program a computer to perform a process in accordance with the present invention. The present invention may also include a computer product which may be a storage medium including a library of delay shift cells (e.g., cell descriptions) that may be used by electronic design automation (EDA) tools to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions and/or information.

While the invention has been particularly shown and described with reference to the preferred embodiments thereof, it will be understood by those skilled in the art that various changes in form and details may be made without departing from the scope of the invention.

The invention claimed is:

1. A method to redistribute current demand comprising the steps of:
   (A) determining timing arc data for one or more timing arcs of a circuit design comprising standard cells using an electronic design tool;
   (B) checking timing arc data for delay shift target cells among said standard cells and generating a opportunity map indicating one or more delay shift target cells to be replaced by one or more corresponding delay shift cells, wherein said one or more corresponding delay shift cells provide timing budget characteristics that are shifted with respect to the standard cells; and
   (C) substituting at least one standard cell identified as a delay shift target cell with a corresponding delay shift cell, wherein switching current demand of at least one timing arc is redistributed with respect to a clock period and total current demand of the modified circuit design remains substantially similar to total current demand of the unmodified circuit design.

2. The method according to claim 1, further comprising:
   repeating steps B and C for each of the one or more timing arcs.

3. The method according to claim 1, wherein said delay shift cell shifts a time at which one or more downstream circuits associated with one or more respective timing arcs switch.

4. The method according to claim 1, wherein said delay shift cell comprises a cell selected from the group consisting of a flip-flop cell, a multiplexer cell and a full adder cell.

5. The method according to claim 1, further comprising:
   selecting said delay shift cell from a library of predefined delay shift cells.

6. The method according to claim 5, wherein said library of predefined delay shift cells comprises at least one delay shift cell for each standard cell in a base library.

7. The method according to claim 5, wherein said library of predefined delay shift cells comprises a plurality of storage cells, said plurality of storage cells having different timing budgets for providing a variety of setup time and hold time combinations.

8. The method according to claim 5, wherein said library of predefined delay shift cells comprises a plurality of multiplexer cells, said plurality of multiplexer cells providing a variety of timing budgets between data path speeds and selector path speeds.

9. The method according to claim 5, wherein said library of predefined delay shift cells comprises a plurality of full adder cells, said plurality of full adder cells providing a variety of timing budgets for add and carry paths.

10. The method according to claim 5, wherein said predefined delay shift cells of said library of predefined delay shift cells have similar footprints and similar Power and performance characteristics including voltage threshold class to corresponding standard cells.

11. The method according to claim 1, wherein said delay shift cell is substituted for said delay shift target cell to spread out a power demand of one or more corresponding timing arcs over a greater period of time and lower a respective leakage floor value.

12. A tool for electronic design automation comprising:
   a routine for determining timing arc data for one or more timing arcs of a circuit design comprising standard cells using said tool;
   a routine for checking the timing arc data for one or more delay shift target cells among said standard cells and generating a opportunity map indicating one or more delay shift target cells to be replaced by one or more corresponding delay shift cells, wherein said one or more corresponding delay shift cells provide timing budget characteristics that are shifted with respect to the standard cells; and
   a routine for substituting at least one of the standard cells identified as one or more delay shift target cells with a corresponding delay shift cell, wherein switching current demand of at least one timing arc is redistributed with respect to a clock period and total current demand of the modified circuit design remains substantially similar to total current demand of the unmodified circuit design.

13. The tool according to claim 12, wherein said tool is further configured to repeat the checking and substituting routines for each of said one or more timing arcs.

14. The tool according to claim 12, wherein said delay shift cell comprises a cell selected from the group consisting of a flip-flop cell, a multiplexer cell and a full adder cell.

15. The tool according to claim 12, further comprising a routine for selecting said delay shift cell from a library of predefined delay shift cells.

16. The tool according to claim 15, wherein said delay shift cell is selected based upon an amount of asymmetry to be introduced into a respective timing arc.

17. The tool according to claim 15, wherein said library of predefined delay shift cells comprises at least one delay shift cell for each standard cell in a base library.

18. The tool according to claim 15, wherein said library of predefined delay shift cells comprises one or more of (i) a plurality of logic gates configured to provide a variety of timing budgets between path and gate delays, (ii) a plurality of flip-flop cells having different timing budgets configured to provide a variety of combinations of setup time and hold time, (ii) a plurality of multiplexer cells configured to provide a variety of timing budgets between data path speeds and selector path speeds and (iii) a plurality of full adder cells configured to provide a variety of timing budgets for add and carry paths.

19. The tool according to claim 15, wherein said predefined delay shift cells of said library of predefined delay shift cells have similar footprints and similar power and performance characteristics including voltage threshold class to corresponding standard cells.

20. The tool according to claim 12, wherein said tool is configured spread out a power demand of one or more corresponding timing arcs by substituting the delay shift target cell with the corresponding delay shift cell.

21. The tool according to claim 12, wherein said routine for substituting at least one of the one or more delay shift target cells with a corresponding delay shift cell is configured to substitute cells starting with delay shift target cells nearest to a root of a corresponding timing arc.

22. A library of delay shift cells stored in a computer readable storage medium, wherein:
   each of said delay shift cells in said library stored in said computer readable storage medium provide a time budget that is shifted with respect to a corresponding standard cell;
   each of said delay shift cells has power and performance characteristics including voltage threshold class that are similar to the corresponding standard cell; and
   each of said delay shift cells has a footprint that is similar to the corresponding standard cell.

* * * * *